Patented May 8, 1923.

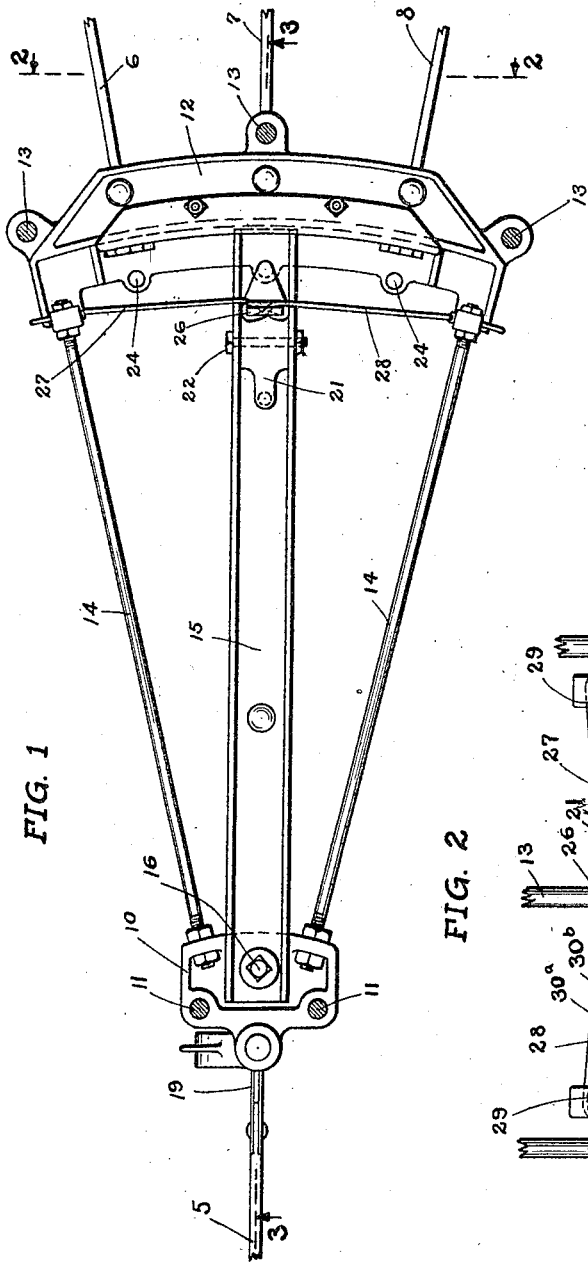

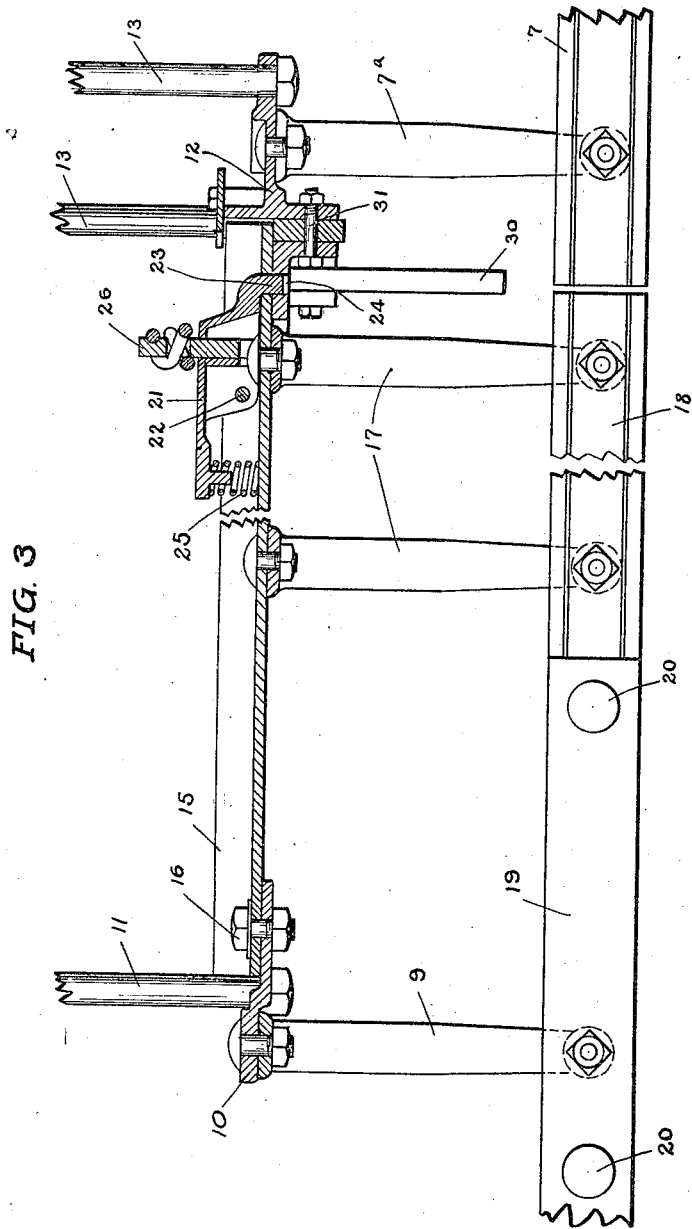

1,454,188

UNITED STATES PATENT OFFICE.

ROBERT F. RASMUSSEN, OF OSHKOSH, WISCONSIN, ASSIGNOR TO C. A. LIBBEY CO., OF OSHKOSH, WISCONSIN, A CORPORATION OF WISCONSIN.

SWITCH FOR OVERHEAD TRACKS.

Application filed November 18, 1921. Serial No. 516,155.

*To all whom it may concern:*

Be it known that I, ROBERT F. RASMUSSEN, a citizen of the United States, and resident of Oshkosh, in the county of Winnebago and State of Wisconsin, have invented new and useful Improvements in Switches for Overhead Tracks, of which the following is a description, reference being had to the accompanying drawings, which are a part of this specification.

This invention relates to improvements in switches for overhead tracks, adapted to carry litter carriers and the like.

The invention contemplates a switching device which is adapted to be interposed between the adjacent ends of a main track and a plurality of branch tracks; and one of the objects of the invention is to provide means for flexibly joining one end of the switch track to the adjacent end of the main track so that a smooth joint between the main track and the switch track will be provided for the trolley even though the other end of the switch track be moved considerably to one side or the other to bring it into alignment with the desired outlying branch track.

In its preferred form the invention contemplates a supporting member for the main track and a second supporting member for the adjacent ends of the branch tracks in combination with a switch member pivotally connected to the first mentioned supporting member the other end of which slidably engages the second mentioned supporting member, the switch member carrying a switch track one end of which is preferably flexibly joined to the adjacent end of the main track, as heretofore described, the other end thereof being adapted to be brought into alignment with any one of the branch tracks when the switch member is pushed to one side or the other; and a further object of the invention is to provide means, preferably a pivotally mounted latch member, for locking the switch member when the free end of the switch track is in alignment with any one of the branch tracks so that there will be no likelihood of the trolley jumping the track when passing from the switch track to any one of the branch tracks, or vice versa.

A further object of the invention is to provide novel means for operating the pivoted latch member which preferably also serves as a means for moving the swinging end of the switch member to one side or the other.

A further object of the invention is to provide guard means associated with the respective branch tracks and preferably operating automatically to prevent the trolley from running off the branch tracks into the open switch when the switch track is not in alignment therewith.

The invention consists in the novel constructions, arrangements and devices to be hereinafter described and claimed for carrying out the above stated objects and such other objects as will appear from the following description of a certain preferred embodiment illustrated in the accompanying drawings, wherein—

Fig. 1 is a plan view of a switching device embodying the principles of the invention;

Fig. 2 is a transverse sectional view taken on the line 2—2 of Fig. 1; and

Fig. 3 is a longitudinal sectional view taken on the line 3—3 of Fig. 1.

Like characters of reference designate like parts in the several views.

Referring now to the drawings, it will be seen that the switching device is shown in combination with a main track 5 and branch tracks 6, 7 and 8. The end of the main track adjacent the switching device is supported from the lower end of an arm 9, the upper end of which is secured to a supporting member 10, the supporting member 10 being itself supported by any suitable means, for example, supporting rods 11 attached to the roof of the building, or other suitable means, (not shown). The ends of the respective branch tracks adjacent the switching device are likewise secured to the lower ends of supporting arms 6ª, 7ª and 8ª, the upper ends of which are secured to a supporting member 12 which is held in position by a plurality of supporting rods 13 similar to the rods 11. To prevent any relative longitudinal movement between the main track and the branch tracks, the supporting members 10 and 12 are secured together by tie or brace rods 14.

The switching device includes a longitudinally extending member 15, which is preferably in the form of a channel bar positioned with its flanges extending upwardly, one end of which is pivotally connected to the supporting member 10 by a bolt 16, the other or free swinging end thereof slidably engaging a portion of the supporting member 12. The member 15 carries a plurality of supporting arms 17 to the lower ends of which is secured a switch track 18. The end of the switch track 18 adjacent the main track is flexibly joined to the main track preferably by providing a plurality of spring leaves 19 placed on edge against each other, the respective ends of said leaves being secured to the main track and the switch track by rivets 20. By this arrangement when the member 15 is in its central position, the switch track 18 will be in alignment with the branch track 7 and by pushing the swinging end of the member 15 to one side the free end of the switch track may be brought into alignment with the branch track 6. Likewise by pushing the swinging end of the member 15 in the opposite direction the free end of the switch track 18 may be brought into alignment with the branch track 8. In switching devices of this type, as heretofore constructed, when the free end of the switch track is swung so as to be in alignment with the outlying branch tracks, an abrupt joint has been formed between the other end of the switch track and the main track which often caused the trolley to be derailed. By providing a flexible connection, as described, between the switch track and the main track a smooth, well-rounded, unbroken joint is provided therebetween so that all tendency for the trolley to jump the track is eliminated even though the free end of the switch track be pushed around considerably to one side or the other.

In order to maintain the switch track in alignment with the branch track while the trolley is passing over a latch member 21 is pivotally mounted on a bolt 22 which extends through the upstanding flanges of the channel member 15, the end of the latch member adjacent the branch tracks having a downwardly extending nose portion 23 which is adapted to extend into apertures 24 formed in the supporting member 12 and so arranged that the latching member may slip into one of said apertures whenever the member 15 is moved to bring the free end of the switch track into alignment with any one of the branch tracks. A spring 25 is adapted to maintain the nose of the latch member in the respective apertures 24 provided in the supporting member 12.

The latch member 21 is provided with an upstanding operating portion 26 to which cables 27 and 28 are attached, said respective cables extending over pulleys 29 mounted on the supporting member 12. The cables 27 and 28 are long enough to come within reaching distance of the ground. The connection of the cables 27 and 28 with the portion 26 is somewhat below the plane of the upper edge of the pulleys 29, consequently, when the cables are pulled, the latch member is raised sufficiently to remove the nose thereof from operative engagement with the supporting member 12. After the latch member has been released in this manner, a further pull upon the proper cable will swing the member 15 of the switching device to bring the free end of the switch track into alignment with the desired branch track.

In order to prevent the trolley from running off the branch tracks into the open switch, swinging guard members 30 are associated with the respective branch tracks, as clearly shown in Fig. 2. The upper ends of these guard members extend through suitable apertures provided in the supporting member 12 and are each pivotally secured to the member 12 by a bolt 31, see Fig. 3. The upper end of each guard member is provided with bevelled surfaces 30$^a$ and 30$^b$, which surfaces are adapted to be engaged by the swinging end of the member 15 so that when one of said surfaces is engaged by the member 15, the guard member 30 will be swung to one side or the other out of the way. In the drawings it will be noted that the switch member 15 is positioned so that the switch track 18 is in alignment with the branch track 7 and the guard member 30 for that track has been swung to one side by the member 15.

I claim:

1. The combination with a main track, a plurality of branch tracks and supporting means for said tracks, of a switch member, means pivotally connecting one end of the switch member to the supporting means for the main track, a switch track carried by said switch member, means flexibly joining the switch track at one end to the main track, whereby said switch member may be moved horizontally to bring the other end of the switch track into alignment with any of the branch tracks, and a latch mechanism for locking said switch track in its adjusted positions.

2. The combination with a main track, a plurality of branch tracks and supporting means for said tracks, of a switch member, means pivotally connecting one end of the switch member to the supporting means for the main track, a switch track carried by said switch member, and a flexible leaf secured at its respective ends to the adjacent ends of the main track and the switch tracks whereby said switch member may be moved horizontally to bring the other end of the switch track into alignment with any of the branch tracks.

3. The combination with a main track, a plurality of branch tracks and supporting means for said tracks, of a switching device comprising a member pivotally connected at one end to the supporting means for the main track and the other end of said member slidably engaging the supporting means for the branch tracks, a switch track carried by said member, flexible means for maintaining one end of the switch track in operative engagement with the adjacent end of the main track whereby said member may be swung horizontally to bring the other end of the switch track into alignment with any of the branch tracks, a pivoted latching device adapted to lock the swinging end of said member to the supporting means for the branch tracks in any one of its respective positions, guards supported adjacent said branch tracks and means formed on said guards and engaged by said latching device for moving said guards to inoperative position.

4. The combination with a main track, a supporting member for said track, a plurality of branch tracks, and a supporting member for the adjacent ends of said branch tracks, of a switching device comprising a switch member pivotally connected at one end to the first mentioned supporting member the other end thereof slidably engaging the second mentioned supporting member, a switch track carried by said switch member, means to maintain one end of the switch track in operative engagement with the adjacent end of the main track whereby said member may be swung horizontally to bring the other end of the switch track into alignment with any of the branch tracks, pivoted guards, a latch member pivoted on said switch member, said second mentioned supporting member having recesses adapted to be engaged by said latch member and so positioned that said switch track may be locked in alignment with any of the respective branch tracks, projections on said guards, adapted to be engaged by said latch member for moving said guards to inoperative position.

5. The combination with a main track, a supporting member for said track, a plurality of branch tracks, and a supporting member for the adjacent ends of said branch tracks, of a switching device comprising a switch member pivotally connected at one end to the first mentioned supporting member the other end thereof slidably engaging the second mentioned supporting member, a switch track carried by said switch member, means to maintain one end of the switch track in operative engagement with the adjacent end of the main track whereby said member may be swung horizontally to bring the other end of the switch track into alignment with any of the branch tracks, guards arranged at the ends of said branch tracks, a latch member pivoted on said switch member, said second mentioned supporting member having recesses adapted to be engaged by said latch member and so positioned that said switch track may be locked in alignment with any of the respective branch tracks, cables adapted to operate said latch member from the ground, said cables also serving as means to move said switch member into the desired position from the ground, said guards being formed with projections engageable by said latch member in its operative position for moving said guards to inoperative position.

6. The combination with a main track, a plurality of branch tracks and supporting means for said tracks, of a switching device comprising a member pivotally connected at one end to the supporting means for the main track, a switch track carried by said member, a flexible track for maintaining one end of the switch track in operative engagement with the adjacent end of the main track whereby said member may be swung horizontally to bring the other end of the switch track into alignment with any of the branch tracks, a latch member for locking said switch track in its adjusted positions, and guard means associated with the respective branch tracks and adapted to be operated by said latch member, for the purpose specified.

7. The combination with a main track, a supporting member for said track, a plurality of branch tracks, and a supporting member for the adjacent ends of said branch tracks, of a switching device comprising a switch member pivotally connected at one end to the first mentioned supporting member the other end thereof slidably engaging the second mentioned supporting member, a switch track carried by said switch member, means to maintain one end of the switch track in operative engagement with the adjacent end of the main track whereby said member may be swung horizontally to bring the other end of the switch track into alignment with any of the branch tracks, a latch member for locking said switch track in its adjusted positions, and guard members pivotally mounted on said second mentioned supporting member over the respective branch tracks, said guard members being adapted to be engaged by said latch member when said switch track is locked in its adjusted positions, for the purpose specified.

In testimony whereof, I affix my signature.

ROBERT F. RASMUSSEN.